(12) United States Patent
Tamemoto et al.

(10) Patent No.: US 6,874,098 B2
(45) Date of Patent: Mar. 29, 2005

(54) SEMICONDUCTOR INTEGRATED CIRCUIT

(75) Inventors: Hiroshi Tamemoto, Nara (JP); Kenzo Konishi, Yamatokouriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 415 days.

(21) Appl. No.: 09/995,657

(22) Filed: Nov. 29, 2001

(65) Prior Publication Data

US 2002/0066910 A1 Jun. 6, 2002

(30) Foreign Application Priority Data

Dec. 1, 2000 (JP) ........................................ 2000-367702

(51) Int. Cl.⁷ .............................. G06F 1/04; G06F 1/06
(52) U.S. Cl. ........................ 713/500; 713/501; 713/600; 327/115; 327/291
(58) Field of Search ................................. 713/322, 500, 713/501, 600, 601; 327/99, 115, 117, 291, 295

(56) References Cited

U.S. PATENT DOCUMENTS

| | | | |
|---|---|---|---|
| 5,306,962 A | | 4/1994 | Lamb |
| 5,684,418 A | * | 11/1997 | Yanagiuchi ................ 327/99 |
| 5,774,702 A | | 6/1998 | Mitsuishi et al. |
| 5,799,176 A | * | 8/1998 | Kapusta et al. ............. 713/501 |
| 5,963,075 A | * | 10/1999 | Hiiragizawa ................ 327/295 |
| 6,026,498 A | * | 2/2000 | Fuse et al. .................. 713/600 |
| 6,029,249 A | | 2/2000 | Atkinson |
| 6,073,244 A | | 6/2000 | Iwazaki |
| 6,195,753 B1 | * | 2/2001 | Nakamura .................. 713/322 |
| 6,226,738 B1 | * | 5/2001 | Dowling ..................... 712/225 |
| 6,600,575 B1 | * | 7/2003 | Kohara ....................... 358/406 |

FOREIGN PATENT DOCUMENTS

| | | |
|---|---|---|
| JP | A62-232053 | 10/1987 |
| JP | A2-118811 | 5/1990 |
| JP | A3-55614 | 3/1991 |
| JP | 04-127210 A | 4/1992 |
| JP | A5-210433 | 8/1993 |
| JP | A6-112810 | 4/1994 |
| JP | A6-295243 | 10/1994 |
| JP | A6-332583 | 12/1994 |
| JP | A8-18008 | 1/1996 |
| JP | A8-147161 | 6/1996 |
| JP | A8-272479 | 10/1996 |
| JP | A9-22318 | 1/1997 |
| WO | 00/02118 A1 | 1/2000 |

OTHER PUBLICATIONS

Low–power High–speed LSI Circuits & Technology, 1998, 8 pages.

* cited by examiner

*Primary Examiner*—Rehana Perveen
(74) *Attorney, Agent, or Firm*—Birch, Stewart, Kolasch & Birch, LLP.

(57) ABSTRACT

A semiconductor integrated circuit having one or more functional circuit blocks and executing a set of instructions is configured so as to change the operating frequency or halt operation of said one or more functional circuit blocks for each instruction or execution cycle. Another semiconductor integrated circuit, having a plurality of internal or external memory blocks or an internal or external single memory block that can be dealt with as a plurality of logical memory blocks and executing a set of instructions, is configured so as to change the operating frequency according to the performance of the memory block for each instruction or execution cycle so that the operating speed during data access time in execution cycle can be changed.

10 Claims, 11 Drawing Sheets

```
       15   13 12                                      0
Instruction [       |                                  ]
code Block A    Block B
0 0 0    CLK-a      CLK-a
0 0 1    CLK-a      CLK-b
0 1 0    CLK-b      CLK-a
0 1 1    CLK-b      CLK-b
1 0 0    CLK-c      CLK-c
1 0 1    CLK-c      CLK-d
1 1 0    CLK-d      CLK-c
1 1 1    CLK-d      CLK-d
```

FIG. 9A PRIOR ART
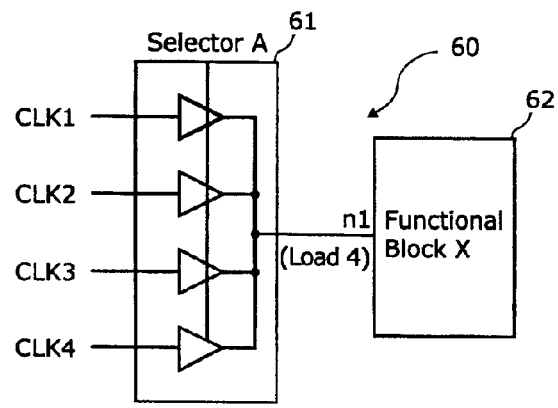
FIG. 9B
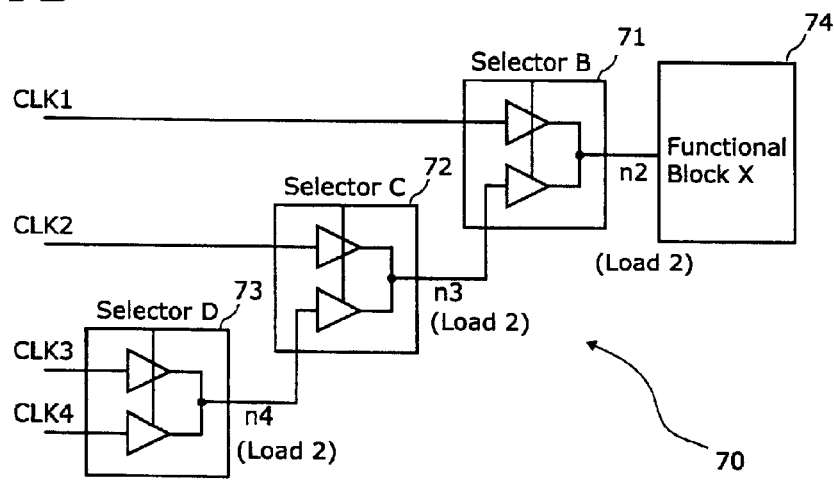
FIG. 9C
| CLK Transition | CLK1 | CLK2 | CLK1 | CLK2 | CLK3 |
|---|---|---|---|---|---|
| Clock selector block 60 | 4 | 4 | 4 | 4 | 4 |
| Clock selector block 70 | 2 | 2 | 2 | 2 | 4 |

| Cycle | Block A | Block B | Block C |
|---|---|---|---|
| 1 | V | | |
| 2 | | V | |
| 3 | V | | B |
| 4 | O | O | O |
| 5 | | B | |

V: Very active operation
O: Ordinally operation
B: Barely noticeable operation

SEMICONDUCTOR INTEGRATED CIRCUIT

BACKGROUND OF THE INVENTION

1. Field of the Invention

The present invention relates to clock technologies for reducing power consumption of semiconductor integrated circuits.

2. Description of the Prior Art

With operation speed of a semiconductor integrated circuit becoming faster in recent years, a percentage of clock-related power consumption in the total power consumed by a semiconductor integrated circuit has been becoming larger. With this being a background, an increased number of clock-related power reduction technologies have been disclosed.

The above-mentioned clock-related power reduction technologies can be broadly grouped into the following five categories:

1. a method for achieving a reduction in power consumption by stopping supplying clocks or by supplying very slow clocks to an unused and unnecessary portion of a circuit;
2. a method for achieving a reduction in power consumption with a specially devised clock or a specially devised clock receiving portion of the circuit consisting of a flip-flop, a latch circuit, or the like;
3. a method for achieving a reduction in power consumption by grouping circuit functions into a few modes and managing the power or the clock for each functional block in accordance with the mode thereof by using dedicated programmed instructions;
4. a method for achieving a reduction in power consumption by adding a change-clock instruction when programs are compiled so as to change the clock speed in accordance with circuit function; and
5. a method for achieving a reduction in power consumption by reducing the clock speed when an instruction requiring an access to a slower peripheral circuit is executed.

First, among the above-mentioned conventional technologies, method 1, "a method for achieving a reduction in power consumption by stopping supplying clocks or by supplying very slow clocks to an unused and unnecessary portion of a circuit," is widely practiced and applied to a small to a large portion of a circuit in various levels. For example, the Japanese Patent Application Laid-Open No. H8-18008 discloses a technology relating to a semiconductor integrated circuit that makes a reduction in power consumption possible by preventing power from being wasted by unused functional blocks. Using this technology, the device controls supply of clock and stops supplying clock to the functional block that is unused at a certain stage. This technology, collectively called a gated circuit, is effective in reducing the power consumption to a large extent.

A similar technology is disclosed by the Japanese Patent Application Laid-Open No. H6-112810. In a digital integrated circuit device comprising a plurality of functional circuit blocks including a used first block and an unused second block in specific modes such as a stand-by mode, power is conserved by reducing current passing through the unused second block by stopping or slowing down the clock supplied thereto.

Another technology disclosed by the Japanese Patent Application Laid-Open No. H6-295243 proposes a data processing device having a pipeline in which a clock being supplied to some stages thereof that are waiting for another stage to complete a time-taking process executed therein, is suspended.

Next, among the above-mentioned conventional technologies, method 2, "a method for achieving a reduction in power consumption with a specially devised clock," is shown in various forms. One example that represents this technology is a technology introduced in Section 2.1.7.1 "A Small-Amplitude Clock Technology" of a book entitled "Low-power High-speed LSI Circuits & Technology" edited by Takayasu Sakurai and published by Realize Company, in which methods for achieving a power reduction with a half-amplitude clock or a specially devised flip-flop circuit are introduced.

Regarding method 3, the Japanese Patent Application Laid-Open Nos. H5-210433 and H6-332583 disclose a power controller for digital electronic equipment, a processor with the power controller, and power management system for digital electronic equipment with the processor in which, for example, voltage or a clock speed is changed at any given time by using an instruction that is added to a set of executable programs so as to control a power supply or a clock frequency. To be more specific, in the above-mentioned device and system, instruction codes purposed for switching power on and off or changing the clock speed are arranged and executed for each internal functional block so as to regulate the power or clock being supplied thereto according to the function mode that the device or system is in. It is suggested that, in many cases, the circuit function be grouped into some modes such as a stand-by or operating mode and that the power or clock be regulated accordingly for a circuit that is barely performing operation.

Among the above-mentioned conventional technologies, method 4, "a method for achieving a reduction in power consumption by inserting a change-clock instruction when programs are compiled," for example, is disclosed in the Japanese Patent Application Laid-Open No. H9-22318 as a technology relating to a processor and control method therefor. In this method, a unit cycle for which the clock is changed plays an important part. In other words, optimizing the process speed by controlling the clock speed in detail requires an insertion of the change-clock instruction too often, which eventually gives an adverse effect to the processing speed to a large degree. On the other hand, reducing the insertions of the change-clock instruction results in a rough control, which, in turn, reduces the processing speed unnecessarily because an overall speed is reduced by a slow circuit. If the processing speed has priority, then the clock can not be slowed down, thereby not contributing to reducing power.

Among the above-mentioned conventional technologies, method 5, "a method for achieving a reduction in power consumption by reducing the clock speed when an instruction requiring an access to a slow peripheral circuit is executed," is, for example, disclosed by the Japanese Patent Application Laid-Open No. S62-232053 as a technology relating to an operation speed controlling device for microcomputer. In this case, even if the slow peripheral circuit is slow only in write time, the entire system must operate at that slow speed as long as the slow peripheral circuit is accessed, thereby slowing the entire system unnecessarily.

The Japanese Patent Application Laid-Open No. H8-147161, in light of the above-mentioned drawback, discloses a technology relating to a data processor that can minimize the reduction in processing speed by inserting a wait state only when a slow peripheral circuit is accessed for reading data. Although this technology is effective in reducing power while maintaining a reduction in processing speed at a minimum, the power consumption for every execution cycle varies to a large extent. In other words, even if power consumed during the wait state is small due to lighter internal operation, the peak current appearing in a cycle before the wait state tends to increase due to an increased number of jobs that are processed simultaneously.

As another method than the five conventional technologies as described before, the Japanese Patent Application Laid-Open No. H8-272479 discloses a variable clock generation device in which different clocks are respectively given to each individual functional unit according to function status thereof.

Described hereinafter with reference to FIGS. 11A and 11B are drawbacks of the conventional method 1, "a method for achieving a reduction in power consumption by stopping supplying clocks to an unused and unnecessary portion of a circuit." FIG. 11A is a schematic diagram showing a general circuit configuration of a semiconductor integrated circuit and FIG. 11B is a table showing the status of each circuit block. A semiconductor integrated circuit 70 comprises: a block A 71, a block B 72, and a block C 73 each performing predetermined operation and processing; a clock generator 74; and a CPU 75 controlling each of the aforementioned circuits.

If one or more of the blocks operate in an instant during any given period of time, the semiconductor integrated circuit 70 must supply the same clock as used in an ordinary operation to the particular blocks that perform the operation. As a result, the semiconductor integrated circuit 70 contributes less to power saving even if the semiconductor integrated circuit 70 controls the other circuits in three modes consisting of supplying clock signal, stopping clock signal, and supplying a slower clock to each block. For example, as shown in FIG. 11B, the block A 71 operates very actively in Cycle 3 while the block C 73 operates barely noticeably during the same period. This means that an amount of saved power is equivalent to the power that is saved by the block B 72 that never operates during the same period.

Furthermore, semiconductor integrated circuits that have been developed recently, have a decreased number of functional blocks that can be halted entirely during wait mode such as stand-by mode. Because of this, the method for halting the clock entirely can not be applicable in many cases. To cope with this problem, a method to control the clock during stand-by mode slower than during operating mode has been disclosed. However this method does not teach any measures relating to the operating mode. This means that even in the case where even a slower clock is sufficient, an ordinary faster clock is kept being supplied, resulting in no reduction in power even during the wasteful operation.

Among the conventional technologies, as method 2, "a method for achieving a reduction in power consumption with a specially devised clock," in which amplitude of the clock is reduced to half or the like is disclosed. This method requires additional wiring for power supply, different from the one used for clocking a logic circuit, and has such drawbacks as an increased chip size and a reduced circuit noise margin.

Among the conventional technologies, method 3, "a method for achieving a reduction in power consumption by grouping circuit functions into a few modes and managing the power or the clock for each functional block in accordance with the mode thereof by using dedicated programmed instructions," requires that the circuit be divided clearly into a few modes. The Japanese Patent Application Laid-Open No. H9-22318 discloses the processor and control method therefor, in which instructions must be added into an existing set of programs after an analysis of effective ways for reducing power consumption.

In the conventional method 4, "a method for achieving a reduction in power consumption by inserting a change-clock instruction when programs are compiled so as to change the clock speed in accordance with the circuit function," processing is halted when the change-clock instruction is executed. Additionally, as previously described, this method has a drawback in which a detailed control requires that the clock speed be changed frequently, resulting in accumulation of wasteful time.

In the conventional method 5, "a method for achieving a reduction in power consumption by reducing the clock speed when an instruction requiring an access to a slower peripheral circuit is executed," a wait state is usually added when the system accesses a peripheral circuit, such as a memory circuit that operates at a speed slower than the system speed. During this period, circuits not relating to said access, maintain the status thereof without making any process. Even so, it is necessary to keep controlling these circuits with clocks for keeping the status thereof, resulting in a wasteful circuit operation. The Japanese Patent Application Laid-Open Nos. H3-55614, H2-118811, and S62-232053 disclose methods for slowing down the clock in accordance with the memory processing speed without adding a wait state as a technology for use in an electronic device, a microcomputer, and an operation speed controlling device for microcomputer. However, in these methods, memory access is achieved at considerable penalties in the operation speed of the system.

As another method than the five conventional technologies as described before, the Japanese Patent Application Laid-Open No. H8-272479 discloses a variable clock generation device. In this device, when multiple processes are simultaneous performed, each process requires a different time to be completed depending on the contents of the process. In many cases, a process that has been completed earlier maintains the resulting data thereof until a slower process is completed. Controlling with clocks is necessary for maintaining the data, resulting in a wasteful circuit operation.

SUMMARY OF THE INVENTION

An object of the present invention is, in light of drawbacks of the conventional technologies, to provide a semiconductor integrated circuit having one or more functional circuit blocks and executing a set of instructions while reducing power consumed thereby more effectively.

To achieve the above object, the semiconductor integrated circuit has the following structures and features.

A semiconductor integrated circuit having one or more functional circuit blocks and executing a set of instructions, comprises a clock supply circuit that supplies one or more clocks for driving said one or more functional circuit blocks at a different frequency, and a clock selector circuit that selects a clock being fed to each of the functional circuit blocks for each execution cycle, wherein the clock supply circuit and the clock selector circuit are configured so as to change an operating frequency or halt operation of said one or more functional circuit blocks for each execution cycle.

A semiconductor integrated circuit having one or more functional circuit blocks and executing a set of instructions is configured so as to change the speed of clock or stop supplying clocks given to each functional circuit block for each execution cycle of the instruction. Because of this configuration, it is possible to conserve power more efficiently while keeping a reduction in operating speed to an absolute minimum.

A semiconductor integrated circuit having one or more functional circuit blocks and executing a set of instructions, comprises a clock supply circuit that supplies one or more clocks for driving said one or more functional circuit blocks at a different frequency, a clock selector circuit that selects a clock being fed to each of the functional circuit blocks for each execution cycle, and an instruction decoder circuit that feeds a selection signal to the clock selector circuit for selecting a most appropriate clock from one or more clocks by analyzing prescribed bits of an instruction code, wherein the clock supply circuit and the clock selector circuit are configured so as to change an operating frequency or halt operation of said one or more functional circuit blocks for each execution cycle.

A semiconductor integrated circuit having one or more functional circuit blocks and executing a set of instructions is configured so as to read an appropriate clock speed for each functional circuit block from an instruction code in order to change the speed of clock or stop supplying clocks given to each functional circuit block for each execution cycle of the instruction code. Because of this configuration, it is possible to control a system clock without additionally inserting an instruction for controlling clocks and conserve power more efficiently while keeping a reduction in operating speed to an absolute minimum.

A semiconductor integrated circuit having, internally or externally, one or more memory blocks or a single memory block that is dealt with as a plurality of logical memory blocks and executing a set of instructions, comprises a clock supply circuit that supplies one or more clocks for driving the semiconductor integrated circuits, a part thereof, said one or more memory blocks, or the single memory block at a different frequency when memory is accessed, a clock selector circuit that selects a different clock for each execution cycle when memory is accessed, and a memory select signal circuit that identifies a memory block to be accessed, wherein the clock supply circuit and the clock selector circuit are configured so as to change an operating frequency or halt operation of the semiconductor integrated circuit, a part thereof, said one or more memory blocks, or the single memory block for each execution cycle in accordance with performance of the memory block that is identified by the memory select signal circuit.

A semiconductor integrated circuit, having a plurality of internal or external memory blocks or an internal or external single memory block that can be dealt with as a plurality of logical memory blocks and executing a set of instructions, is configured so as to change the speed of clock according to performance of the memory block for each instruction cycle or each execution cycle. Because of this configuration in which the operating speed during memory access time can be changed, it is possible to conserve power more efficiently while keeping a reduction in operating speed to an absolute minimum when a continuous access to a slower memory block is required.

A semiconductor integrated circuit having one or more peripheral circuits internally or externally and executing a set of instructions, comprises a clock supply circuit that supplies one or more clocks for driving the semiconductor integrated circuits, a part thereof, or said one or more peripheral circuits at a different frequency when said one or more peripheral circuits are accessed, a clock selector circuit that selects a different clock for each execution cycle when said one or more peripheral circuits are accessed, and an I/O select signal circuit that identifies a peripheral circuit to be accessed, wherein the clock supply circuit and the clock selector circuit are configured so as to change an operating frequency or halt operation of the semiconductor integrated circuit, a part thereof, or said one or more peripheral circuits for each execution cycle in accordance with performance of the peripheral circuit that is identified by the I/O select signal circuit.

A semiconductor integrated circuit, having one or more internal or external peripheral circuits and executing a set of instructions, is configured so as to change the speed of clock according to performance of the peripheral circuit for each instruction cycle or each execution cycle. Because of this configuration in which the operating speed during access time to the peripheral circuit can be changed, it is possible to conserve power more efficiently while keeping a reduction in operating speed to an absolute minimum when a continuous access to a slower peripheral circuit is required.

A semiconductor integrated circuit having one or more memory blocks and a cache memory internally or externally and executing a set of instructions, comprises a clock supply circuit that, according to whether a cache hit is experienced or not when data is accessed, supplies one or more clocks for driving the semiconductor integrated circuits, a part thereof, said one or more memory blocks, or the cache memory at a different frequency, a clock selector circuit that, according to whether a cache hit is experienced or not, selects for each execution cycle a different clock when said one or more memory blocks or the cache memory is accessed, and a memory select signal circuit that identifies a memory block or the cache memory to be accessed, wherein the clock supply circuit and the clock selector circuit are configured so as to change an operating frequency or halt operation of the semiconductor integrated circuit, a part thereof, the memory blocks, or the cache memory for each execution cycle according to whether a cache hit is experienced or not when data is accessed.

A semiconductor integrated circuit having one or more functional circuit blocks and executing a set of instructions is configured so as to change the speed of clock or stop supplying clocks given to an internal CPU, a memory circuit, or a cache memory for each instruction cycle or each execution cycle according to whether a cache hit is experienced or not when data is accessed. Because of this configuration in which an appropriate clock speed is chosen depending on whether a cache hit is experienced or not, it is possible to conserve power more efficiently without sacrificing the operating speed.

A semiconductor integrated circuit having one or more functional circuit blocks and executing at least either of data processing or instruction processing in a pipeline having a plurality of stages when running a set of instructions, comprises a clock supply circuit that supplies one or more clocks for driving the stages at a different frequency, a clock selector circuit that selects a different clock to be given to each of the stages for each execution cycle, and an analyzer circuit that analyzes the instructions and feeds a selection signal to the clock selector circuit for selecting a most appropriate clock for each of the stages from one or more clocks, wherein the analyzer circuit is arranged so as to analyze the instructions to be executed in each stage of the pipeline and feeds a signal to the clock selector circuit so that, when the stages execute the instructions having a load different from each other, a stage executing an instruction having a lighter load is provided with a slower clock.

A semiconductor integrated circuit, having one or more functional circuit blocks, executing a set of instructions, and having a pipeline architecture in which at least either instructions or data are processed, is configured so as to slow down a lighter process when a plurality of processes running simultaneously have different loads to be processed. In this arrangement, all the stages of the pipeline complete the process almost at the same time. Because of this configuration, it is possible to level off and reduce the power consumption as a whole and, at the same time, to suppress a peak current occurring during operation efficiently.

A semiconductor integrated circuit having one or more functional circuit blocks and executing a set of instructions in a plurality of pipelines configured as a superscalar architecture, comprises a clock supply circuit that supplies one or more clocks for driving each of the pipelines at a different frequency, a clock selector circuit that selects a different clock to be fed to each of the pipelines for each execution cycle, an analyzer circuit that analyzes the instructions and assign a weight value to each instruction according to an amount of load thereof to be processed, and an instruction distributor circuit that distributes the instructions among the pipelines by comparing the instructions in a form of the set with weight values contained in a table generated by the analyzer circuit, wherein the clock selection circuit selects a faster clock for a pipeline that executes an instruction having a heavier load and selects a slower clock for a pipeline that executes an instruction having a lighter load.

A semiconductor integrated circuit, having one or more functional circuit blocks and having a superscalar architecture in which a plurality of processing sections execute a set of instructions, is configured so as to supply each independent clock to each of the processing sections. Because of this arrangement in which the clock speed is changed for each processing section in accordance with the load of instructions running simultaneously, it is possible to output the results almost at the same time and reduce power consumption without sacrificing an overall processing speed.

A semiconductor integrated circuit having one or more functional circuit blocks and executing a set of instructions in a plurality of processing sections configured as a VLIW (Very Long Instruction Word) architecture, comprises a compiler that converts the instructions into a VLIW format and assigns a most suitable clock to each of the instructions in accordance with content thereof to be processed, a clock supply circuit that supplies one or more clocks for driving each of the processing sections at a different frequency, and a clock selector circuit that selects the clock assigned to each instruction by the compiler so that the selected clock is fed to a corresponding processing section for each execution cycle, wherein the semiconductor integrated circuit is configured so as to provide each of the processing sections with an independent clock that enables the processing sections to operate at a frequency different from each other according to a load of the instructions to be executed simultaneously.

A semiconductor integrated circuit, having one or more functional circuit blocks and having a VLIW (Very Long Instruction Word) architecture in which a plurality of processing sections execute a set of instructions, is configured so as to supply each independent clock to each of the processing sections. Because of this arrangement in which the clock speed is changed for each processing section in accordance with the load of instructions running simultaneously, it is possible, without reducing an overall processing speed, to reduce power consumption by eliminating wasteful internal operations.

A semiconductor integrated circuit having one or more functional circuit blocks and executing a set of instructions, comprises a clock supply circuit that supplies one or more clocks for driving said one or more functional circuit blocks at a different frequency, and a clock selector circuit that selects a clock being fed to each of the functional circuit blocks for each execution cycle, wherein the clock selector circuit has a hierarchically-arranged selector architecture in which clock branches are arranged hierarchically in accordance with frequency of use of the clocks in changing an operating frequency or halting operation of each functional circuit block while the instructions are being executed.

A semiconductor integrated circuit having one or more functional circuit blocks and executing a set of instructions is configured so as to have a hierarchically-arranged selector architecture arranged in accordance with frequency of use of the clocks in changing an operating frequency or halting operation of each functional block for each instruction or execution cycle. Because of this arrangement, in comparison with a simplified clock selector, it is possible to reduce the capacity of wiring required for bearing a total amount of load generated during selecting clocks, thereby providing more stable operating condition.

A semiconductor integrated circuit having one or more functional circuit blocks and executing a set of instructions, comprises a compiler that determines a most appropriate clock for each instruction according to contents thereof to be executed and writes information thereof thus determined to prescribed bits of a compiled instruction code, a clock supply circuit that supplies one or more clocks for driving said one or more functional circuit blocks at a different frequency, a clock selector circuit that selects a clock being fed to each of the functional circuit blocks for each execution cycle, and an instruction decoder circuit that feeds a selection signal to the clock selector circuit for selecting a most appropriate clock from one or more clocks by analyzing the prescribed bits of the instruction code, wherein the clock supply circuit and the clock selector circuit are configured so as to change an operating frequency or halt operation of said one or more functional circuit blocks for each execution cycle.

A compiler is designed so as to analyze a processing speed for each instruction and select a most appropriate clock speed for executing each instruction so that a set of bits having clock speed information are generated in an output instruction code for operation at that clock speed selected in an semiconductor integrated circuit. The semiconductor integrated circuit having one or more functional circuit blocks and executing the set of instructions is configured so as to read a set of the specific bits of the instruction code for determining a most appropriate clock speed for each functional circuit block in order to change the speed of clock or stop supplying clocks given to each functional block for each instruction cycle or execution cycle. Because of this configuration, it is possible, without additionally inserting an instruction for controlling clocks when making programs, to conserve power while keeping a reduction in operating speed to an absolute minimum.

BRIEF DESCRIPTION OF THE DRAWINGS

This and other objects and features of the present invention will become clear from the following description, taken in conjunction with the preferred embodiments with reference to the accompanying drawings in which:

FIG. 9A is a circuit diagram showing a conventional clock selector;

FIG. 9B is a circuit diagram showing a hierarchically-arranged selector architecture of a ninth embodiment;

FIG. 9C is a table showing total loads generated when clocks are changed in the conventional clock selector and the hierarchically-arranged clock selector of the ninth embodiment;

DESCRIPTION OF THE PREFERRED EMBODIMENTS

Hereinafter, embodiments of the present invention will be described with reference to the accompanying drawings.
First Embodiment A semiconductor integrated circuit of a first embodiment has a circuit configuration so as to change an operating frequency or stop supplying clocks for each execution cycle when instructions having a plurality of execution cycles are executed. It is a common practice to add a wait state when a semiconductor integrated circuit performs a time-consuming operation or accesses a slower peripheral circuit. On the contrary, in the identical case in this embodiment, an instruction that clocks the execution cycle at a slower frequency is added. Furthermore, if the process has a lighter load and an execution cycle that can be driven faster, an instruction that drives the execution cycle at a faster frequency is inserted in order to increase circuit speed as a whole. Controlling the clock as mentioned above can be applied not only to an entire circuit but also to each individual functional block.

Figure 1A:
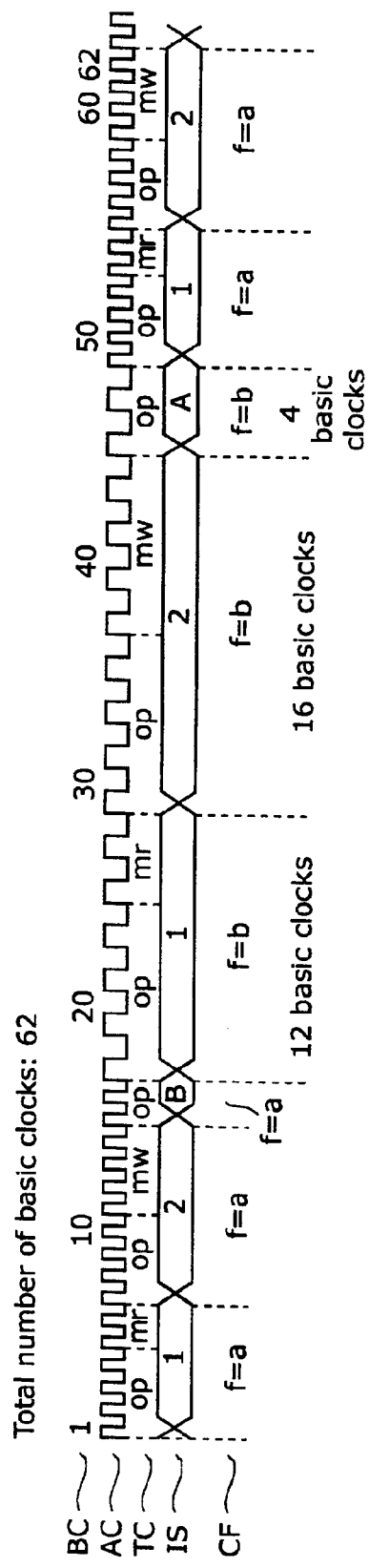
FIG. 1A is an operational timing chart of a conventional semiconductor integrated circuit.
Figure 1B:
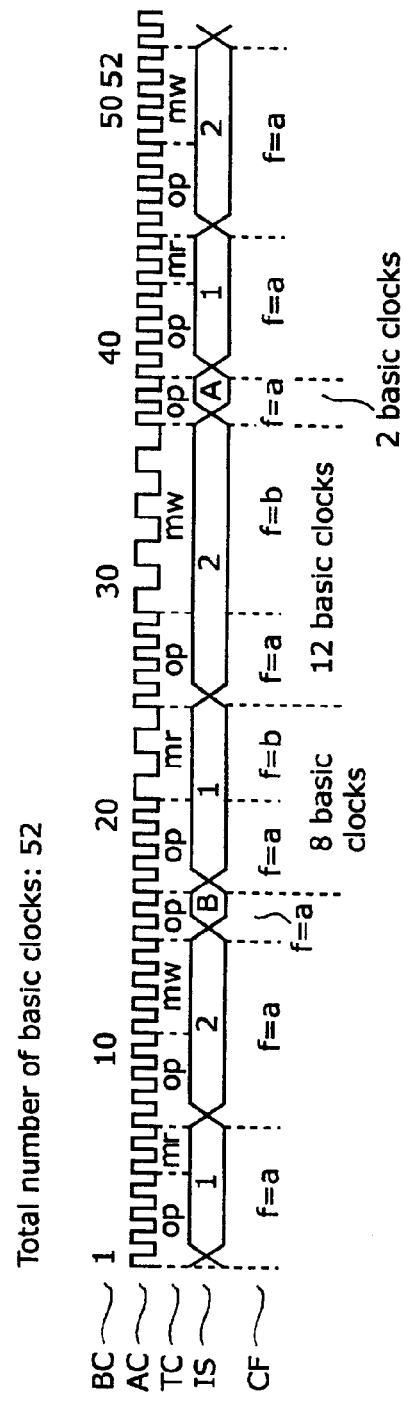
FIG. 1B is an operational timing chart of a semiconductor integrated circuit of a first embodiment.
Figures 2, 3A:
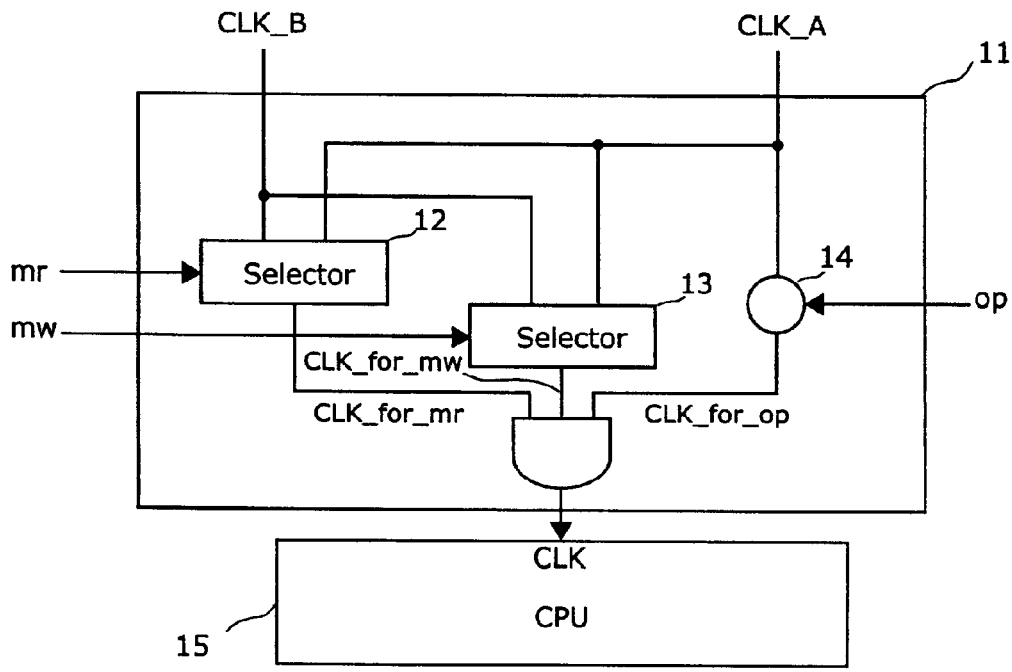
FIG. 2 is a diagram showing a circuit configuration of a selector for use in the first embodiment.
FIG. 3A is a schematic diagram showing a relationship between an instruction code and each block used in a semiconductor integrated circuit of a second embodiment.
Figures 11A, 11B:
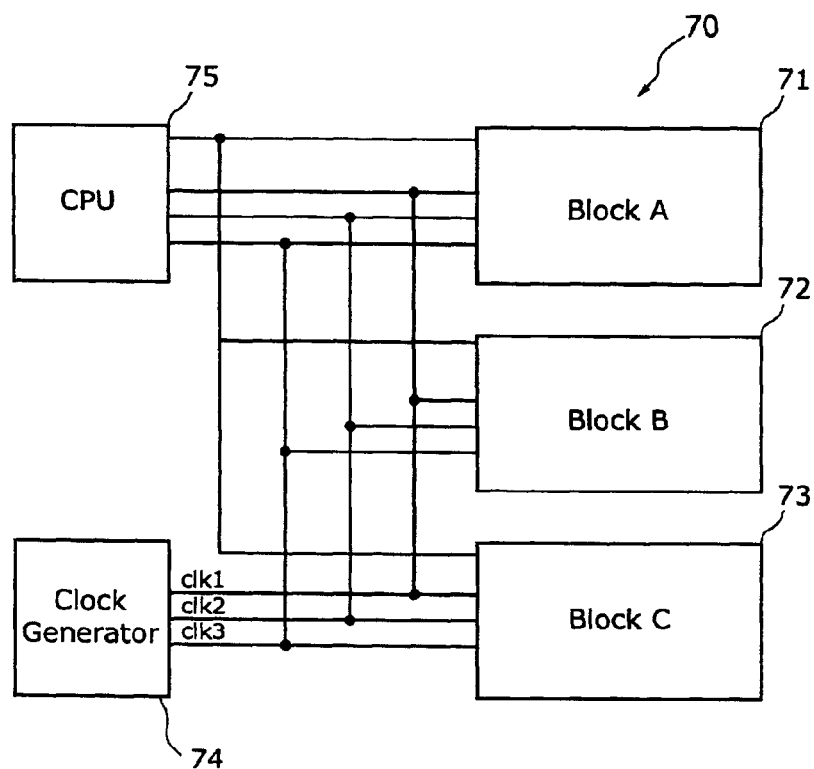
FIG. 11A is a schematic diagram showing a general circuit configuration of a semiconductor integrated circuit.
FIG. 11B is a table showing status of each block in the general circuit configuration of the semiconductor integrated circuit.

FIG. 11A is an operational timing chart of a conventional semiconductor integrated circuit and FIG. 1B is an operational timing chart of a semiconductor integrated circuit of a first embodiment. In FIGS. 1A and 1B, among symbols used in the timing charts: BC indicates a basic clock; AC indicates an actual clock; TC indicates names of execution cycle; IS indicates instructions; and CF indicates clock frequencies. FIG. 2 is a diagram showing a circuit configuration of a selector for use in the first embodiment. In a conventional method (the Japanese Patent Application Laid-Open No. H6-332583) as shown in FIG. 1A, once a change-clock instruction Inst_B is executed when the circuit is being clocked with a basic clock at frequency a, all the ensuing operations will be clocked at frequency b. Moreover, once a change-clock instruction Inst_A is executed when the circuit is being clocked at frequency b, all the ensuing operations will be clocked at frequency a.

By contrast, in this embodiment as shown in FIG. 1B, while the circuit operates with a basic clock at frequency a, even if the change-clock instruction Inst_B is executed, all the ensuing operations will not be clocked at frequency b. Instead, a fetch cycle op is clocked at faster frequency a and only such specific cycles as a memory read cycle mr and a memory write cycle mw during a slower memory access or the like are clocked at slower frequency b. Selecting the clock can be performed by, for example, a selector 11 as shown in FIG. 2. The selector 11 comprises selectors 12, 13, and a changeover switch 14. An input terminal CLK_A is connected to the selectors 12, 13, and the changeover switch 14. Furthermore, an input terminal CLK_B is connected to the selectors 12 and 13. In the selector 12, a signal CLK_for_mr is selected as an outgoing signal in association with an input signal fed to a terminal mr. In the selector 13, a signal CLK_for_mw is selected as an outgoing signal in association with an input signal fed to a terminal mw. In the changeover switch 14, a signal CLK_for_op is fed out or stopped according to a signal input from a terminal op. The selector circuit 11 is controlled by a CPU 15, a control means, for each execution cycle.

Although it is not shown, the method for changing the clock for a specific cycle can be applicable not only to an entire semiconductor integrated circuit but also to a specific functional block. As shown in FIG. 1A, in the operational timing chart of a conventional semiconductor integrated circuit, it takes a total of 62 basic clocks to complete the third mw cycle. In comparison, as shown in FIG. 1B, the semiconductor integrated circuit of this embodiment takes a total of 52 basic clocks to do the same operation. Therefore, the semiconductor integrated circuit of this embodiment performs the operation 16% faster compared with the conventional circuit while maintaining power consumption still low.
Second Embodiment In a second embodiment, a semiconductor integrated circuit is configured so as to automatically analyze instructions to be executed and decide a clock that will be used for each functional block and execution cycle in accordance with amount and capability of the process involved. In this way, in addition to controlling an entire circuit at a certain frequency, it is also possible to control only a specific internal circuit by feeding a slower clock or by stopping the clock supply while maintaining an overall speed of the operation unchanged. Moreover, this can be achieved without adding special instructions designed for controlling the clock.

Usually, instruction codes performing a similar operation have a similar code structure. This tendency is noticeably observed in certain bits of the instruction code. In this embodiment, a semiconductor integrated circuit designed to utilize these bits for conserving power is provided.

FIG. 3A is a schematic diagram showing a relationship between an instruction code and each block used in a semiconductor integrated circuit of a second embodiment. In FIG. 3A, higher three bits of the instruction code are the aforementioned special bits. For simplifying descriptions, an example shown in FIG. 3A is arranged so that the semiconductor integrated circuit, by reading the higher three bits, determines a clock frequency to use among four clocks, CLK-a to CLK-d, and also determines a block to which the clock is fed among two circuit blocks, Block A and Block B.

For example, assuming that a first bit (bit 15 in a code) in the higher three bits (data) is 0, regardless of a value of a third data bit (bit 13), CLK-a is selected for the Block A as a driving frequency if a second data bit (bit 14) is 0, or CLK-b is selected for the Block A as a driving frequency if the second data bit is 1. Assuming that the first data bit (bit 15) is 0, regardless of a value of the second data bit (bit 14), CLK-a is selected for the Block B as a driving frequency if the third data bit (bit 13) is 0, or CLK-b is selected for the Block B as a driving frequency if the third data bit (bit 13) is 1. Again assuming that the first data bit (bit 15) is 1, regardless of a value of the third data bit (bit 13), CLK-c is selected for the Block A as a driving frequency if the second data bit (bit 14) is 0, or CLK-d is selected for the Block A as a driving frequency if the second data bit (bit 14) is 1. Once again assuming that the first data bit (bit 15) is 1, regardless of a value of the second data bit (bit 14), CLK-c is selected for the Block B as a driving frequency if the third data bit (bit 13) is 0, or CLK-d is selected for the Block B as a driving frequency if the third data bit (bit 13) is 1.

Figure 3B:
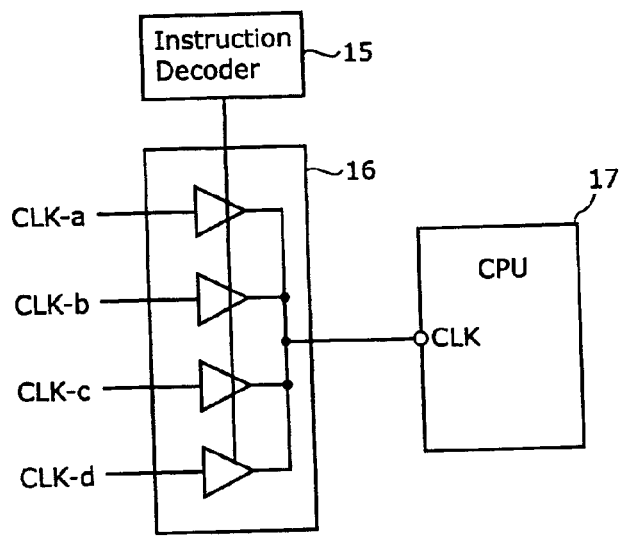
FIG. 3B is a schematic diagram showing an example of circuit configuration of the semiconductor integrated circuit of the second embodiment.
Figure 3C:
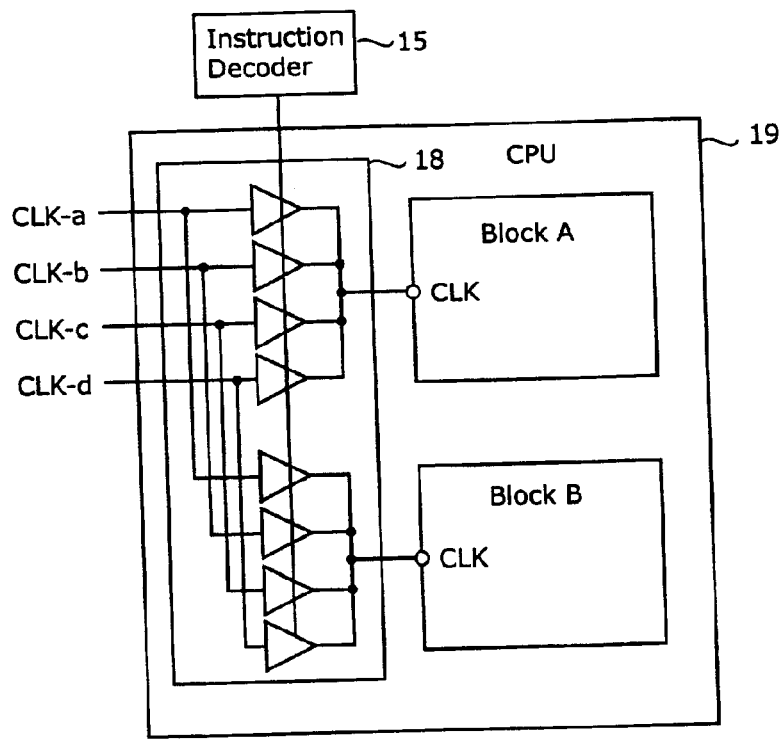
FIG. 3C is a schematic diagram showing another example of circuit configuration of the semiconductor integrated circuit of the second embodiment.

Circuits that perform the above-mentioned control are shown in FIGS. 3B and 3C. FIG. 3B is a schematic diagram showing an example of circuit configuration of the semiconductor integrated circuit of the second embodiment. An instruction decoder 15 analyzes said higher three bits and controls a selector 16 so as to select one clock from four clocks CLK-a to CLK-d for an external CPU 17. FIG. 3C is a schematic diagram showing another example of circuit configuration of the semiconductor integrated circuit of the second embodiment. It is also possible, as shown in this illustration, to include a selector 18 in a CPU 19 having a plurality of functional blocks. In this way, it is possible to achieve a reduction in power consumption without sacrificing the operation speed if a most appropriate clock speed for each instruction cycle is selected for controlling each functional block at an optimized speed.

Third Embodiment

In a third embodiment, a semiconductor integrated circuit is configured so as to change an operating frequency that drives the circuit according to an enabling signal of each memory block that is connected internally or externally. For example, in the case where the circuit accesses a memory block at a basic clock speed and exchanges data therewith, a conventional method requires a wait state be added into a set of instructions due to a slower speed of the memory block. In this embodiment, this can be achieved, without adding the wait state, by slowing down the entire circuit speed while the circuit is accessing the memory block for exchange of data. In another conventional method, for example, the clock speed is controlled for each instruction cycle when the circuit is accessing a slower memory block. In other words, an entire single instruction consisting of a series of execution cycles such as an operation code fetch cycle and a memory read cycle, or an operation code fetch cycle and a memory write cycle, is performed at a slower clock speed during memory access. This method, however, reduces the operation speed considerably.

According to the present invention, a controller comprising a CPU controls the clock for each execution cycle. More specifically, while a slower memory block is being accessed, the CPU controls the circuit so that a basic clock is selected during the operation code fetch cycle and a slower clock is selected only during the memory read or memory write cycle. In this way, a wasteful process relating to the wait state can be avoided and a reduction in the operation speed of the system as a whole is limited to an absolutely necessary time.

Figure 4A:
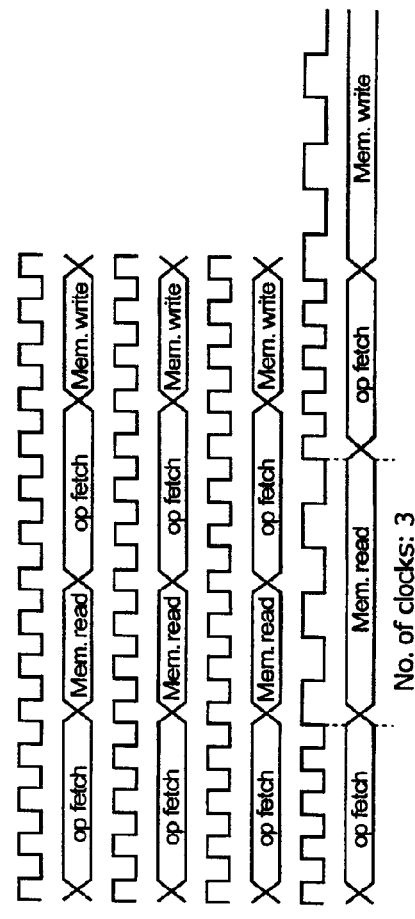
FIG. 4A is a schematic diagram showing a circuit configuration of a semiconductor integrated circuit of a third embodiment.
Figure 4B:
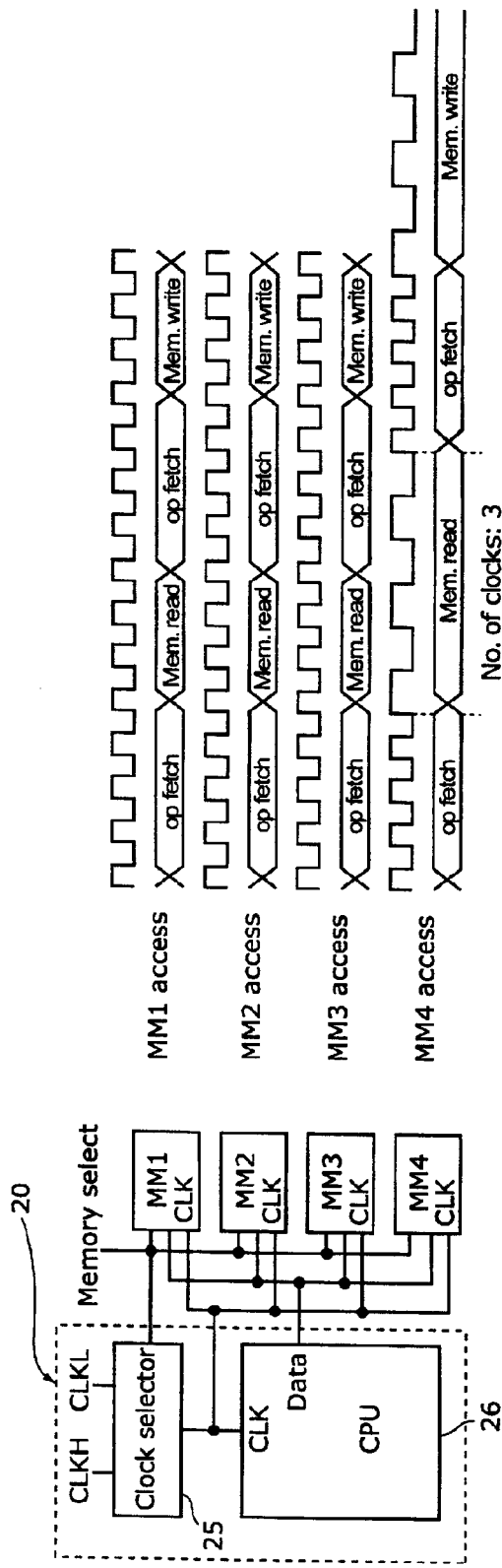
FIG. 4B is a timing chart of the semiconductor integrated circuit of the third embodiment.
Figure 4C:
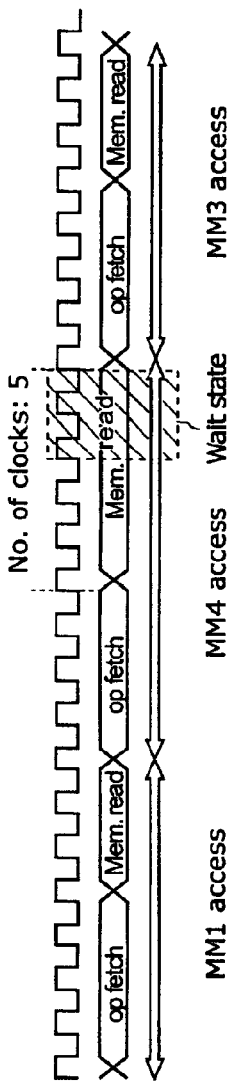
FIG. 4C is a timing chart of a conventional semiconductor integrated circuit.

FIG. 4A is a schematic diagram showing a circuit configuration of a semiconductor integrated circuit of the third embodiment. FIG. 4B is a timing chart thereof and FIG. 4C is a timing chart of a conventional semiconductor integrated circuit. A semiconductor integrated circuit 20 includes a clock selector 25 and a CPU 26 and is equipped with external memory blocks MM1 to MM4. A memory select signal is given to the external memory blocks MM1 to MM4 and the clock selector 25 for choosing a memory block to access. The clock selector 25 has input terminals to receive a slower clock CLKL and a faster clock CLKH respectively. A clock that has been selected by the clock selector 25 is fed to each input terminal CLK of the CPU 26 and of the external memory blocks MM1 to MM4. Data bus connects the CPU 26 with the external memory blocks. Furthermore, the clock selector 25 is controlled by the CPU 26 for every instruction cycle or every execution cycle.

If, for example, only the external memory block MM4 is a slow device in terms of memory access time, upon assertion of an enabling signal allowing an access to the memory block MM4, the slower clock CLKL is selected by the clock selector 25 and the entire circuit operates at that slower speed. When another memory block is selected or when the operation is not in a memory access cycle (e.g. op fetch cycle in FIG. 4B), the faster clock is selected. In this arrangement, because the wait state that is required to be added to an instruction set in a conventional method as shown in FIG. 4C is not required any more, it is possible to reduce a number of clocks (reduced by 2 clocks in FIG. 4C), thereby contributing to reducing the power consumption.

The memory block is not limited to such external memory blocks as MM1 to MM4 as shown in FIGS. 4A to 4C. This may be an internal memory block of the semiconductor integrated circuit or any other single memory block that can be arranged as a plurality of logical memory blocks.

Fourth Embodiment

In a fourth embodiment of the present invention, when peripheral circuits are connected to a semiconductor integrated circuit, the semiconductor integrated circuit is configured in the same manner as in the third embodiment so as to change operating frequency or stop clocks for each instruction cycle or each execution cycle in accordance with an I/O enabling signal. The configuration and function of the semiconductor integrated circuit are similar to those shown in FIG. 4A, if the external memory blocks MM1 to MM4 and the memory select signal are replaced with the peripheral circuits and an I/O select signal respectively. In the timing chart shown in FIG. 4B, the memory read and write cycles are replaced with I/O read and write cycles respectively. In this arrangement, as is the case with the third embodiment, the wait state that is required to be added to an instruction set in a conventional method is not required. Therefore, it is possible to reduce a number of clocks, thereby conserving power.

Fifth Embodiment

In a fifth embodiment of the present invention, a semiconductor integrated circuit is configured so as to change an operating frequency according to whether a cache hit is experienced or not when the internal cache memory is accessed. The semiconductor integrated circuit of the fifth embodiment comprises a CPU, an internal cache memory, and one or more external memory blocks. Usually, in a semiconductor integrated circuit, data access to an external memory block takes longer time than to an internal memory. To cope with this, a semiconductor integrated circuit has a cache memory that can read in advance and store therein the data held in a specific area of the external memory block. In this way, if data access is requested, the circuit reads the data that has been already stored in the cache memory, thereby increasing an overall speed of the semiconductor integrated circuit.

The semiconductor integrated circuit of this embodiment is configured so that the CPU, a control means, controls and changes the clock for each instruction cycle or each execution cycle efficiently according to whether a cache hit is experienced (i.e. the data stored in the cache in advance can be read) or a cache miss is experienced (i.e. the data has not been stored in the cache in advance and the data must be read from the external memory block). In other words, if a cache miss is experienced, the CPU changes the clock to a slower clock so as to synchronize with the speed of the external memory block. On the other hand, if a cache hit is experienced, the CPU increases the clock speed so as to perform a faster data read. Furthermore, if a cache miss is experienced, the CPU can also be configured so that the CPU supplies a slower clock during the data read cycle to only functional blocks that operate during the same cycle, and supplies a faster clock to other functional blocks during the same cycle or to all the functional blocks during other cycles. Here, a selector circuit required to select either of the slower or faster clock can be configured in the same manner as the one used in the third embodiment.

Figure 5:
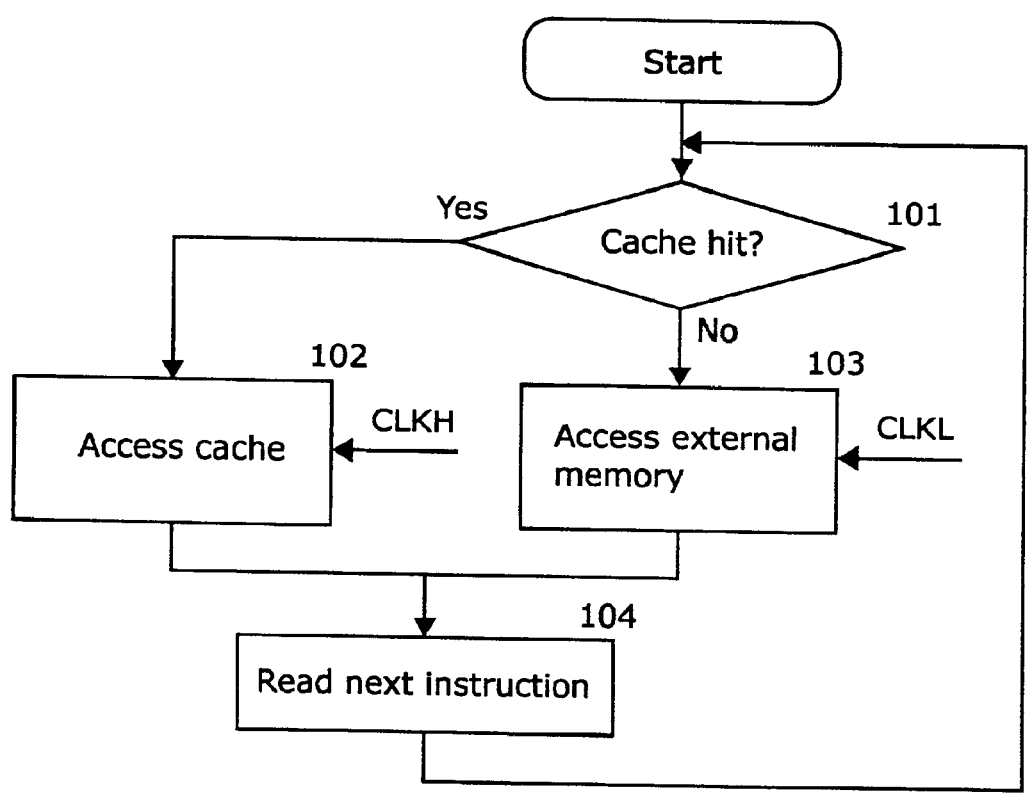
FIG. 5 is a flow chart describing an operation of a semiconductor integrated circuit of a fifth embodiment.

Next, the operation of the semiconductor integrated circuit is described with reference to FIG. 5. FIG. 5 is a flow chart describing an operation of a semiconductor integrated circuit of the fifth embodiment. First, the CPU in the semiconductor integrated circuit accesses the cache memory when reading specific data and, then, will perform different processes depending on whether a cache hit is experienced or not (step 101). When a cache hit is experienced, the CPU accesses the cache memory with a predetermined faster clock CLKH for reading the specified data therefrom (step 102). Thereafter, the CPU reads the next instruction (step 104). On the other hand, if a cache hit is not experienced (cache miss) at step 101, the CPU accesses the external memory with a predetermined slower clock CLKL for reading the specified data therefrom (step 103). Thereafter, the CPU reads the next instruction (step 104). According to this embodiment, it is possible to achieve a reduction in power consumption without sacrificing the operating speed.

Sixth Embodiment

In a semiconductor integrated circuit having a pipeline for processing data or instructions, each stage of the pipeline has different load to process depending on the jobs that are processed simultaneously. In this case, a stage having a smaller amount of process must wait after completion of the process thereof while holding the processed data until another stage having a larger amount of process to complete the process thereof. In light of this drawback, the semiconductor integrated circuit of the sixth embodiment is configured so as to have independent clocks arranged for each stage of the pipeline for clocking only a stage having a lighter job at slower speed so that each individual stage completes the job thereof almost at the same time. In this arrangement, it is possible to reduce power that is otherwise consumed by holding the completed data.

For example, the Japanese Patent Application Laid-Open Nos. H6-295243 and H8-147161 disclose a data processing device in which, in the aforementioned case, each individual clock which is supplied to each stage is halted (wait state) as soon as the job thereof is completed. While the clock is halted or the circuit is in wait state, the power consumed during this period is smaller than another period because almost no operations are performed internally. However, if there is a cycle in which no operations are performed, it is possible to level off and reduce power consumption as a whole by operating the previous cycle slowly so as to utilize the time which is otherwise wasted by receiving no clocks or a wait state. Furthermore, a peak current occurring during operation of the circuits can also be suppressed in this arrangement.

Figure 6A:
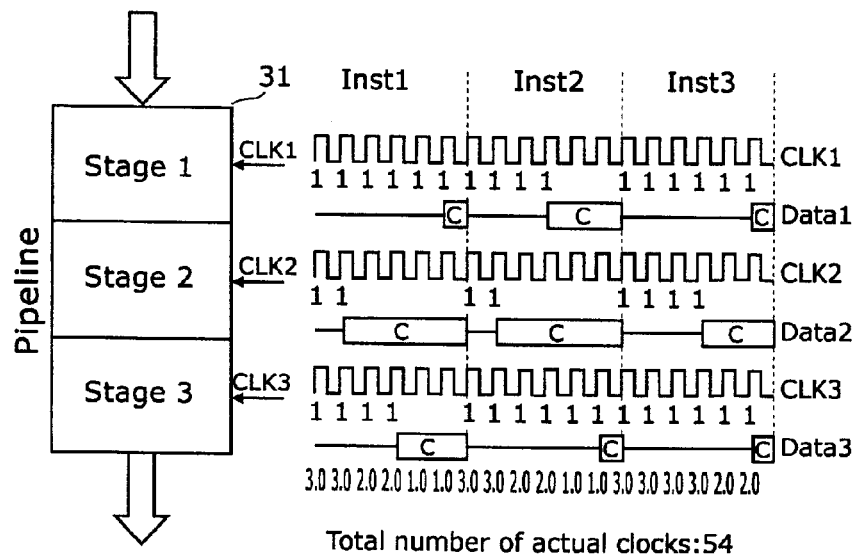
FIG. 6A is a timing chart showing a conventional processing method of a semiconductor integrated circuit having a pipeline.
Figure 6B:
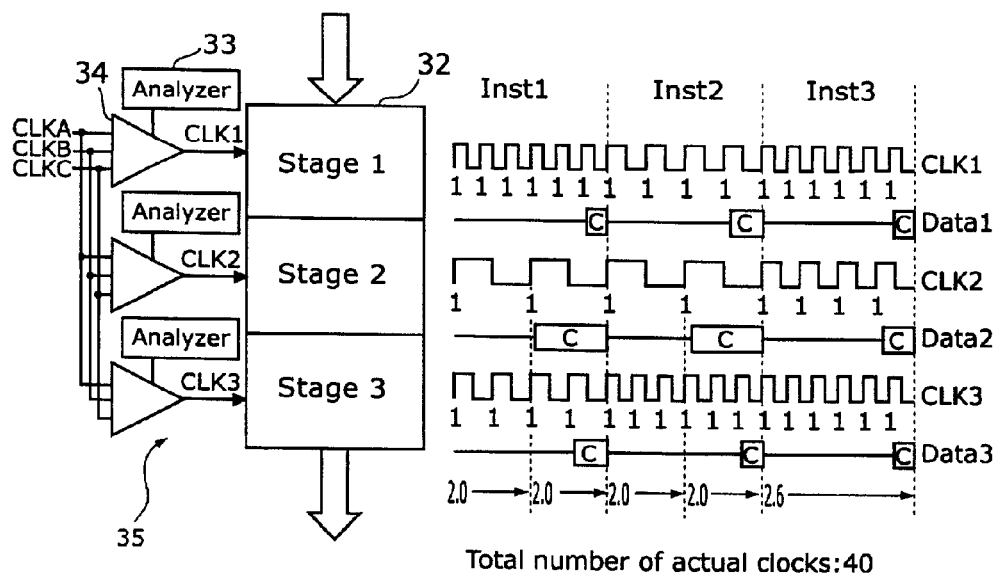
FIG. 6B is a timing chart showing a processing method of a semiconductor integrated circuit having a pipeline architecture of a sixth embodiment.

FIG. 6A is a timing chart showing a conventional processing method of a semiconductor integrated circuit having a pipeline. FIG. 6B is a timing chart showing a processing method of a semiconductor integrated circuit having a pipeline architecture of the sixth embodiment. Assuming that in both FIGS. 6A and 6B, stages 1 to 3 are executed in the pipeline. In FIGS. 6A and 6B, time required for processing data in each stage of pipelines 31 and 32 is shown with a horizontal line for each of Data 1, Data 2, and Data 3. A period in which each stage is holding completed data is shown by "C". When an amount of data to be processed by a single clock before completion is assumed as 1, a total amount of data to be processed by a single clock in the pipeline is calculated and shown near the bottom of FIGS. 6A and 6B. In a conventional circuit as shown in FIG. 6A, during the first half of each instruction cycle for each of instructions Inst1 to Inst3, the total amount of data to be processed in the pipeline will be 3 because an amount of data 1 is be processed in each stage. However, in the latter half of each instruction cycle, the total amount of data to be processed is down to 1 or 2, because one or two stages have already completed the process thereof.

By contrast, as shown in FIG. 6B, the semiconductor integrated circuit of the sixth embodiment is configured so as to have a control circuit 35 comprising an analyzer circuit 33 for analyzing and predicting an amount of data to be processed in each stage of the pipeline and a selector 34 for choosing, for example, an appropriate clock from three clocks so that the total amount of data to be processed is distributed evenly in each clock cycle. This control circuit 35 can be arranged internally or externally for controlling the clock at a slower speed according to a total amount of data to be processed. In this arrangement, a total amount of data in each clock cycle is distributed almost evenly resulting in an amount as low as 2.6 at the highest. In addition, a peak current passing through the circuit is lowered, thereby making it possible to use thinner wiring in the circuit and contributing to an extended battery life.

Seventh Embodiment

In a seventh embodiment of the present invention, a semiconductor integrated circuit having a superscalar architecture is configured so as to feed an independent clock to each pipeline so that a pipeline having a smaller amount of process receives a slower clock. In this arrangement, it is possible to reduce power consumption and manage outputting result at the same timing as in the case of a conventional circuit. A table that contains resulting data obtained through a weighing process in which each instruction is weighed according to the type thereof, the type of operation, and the type of peripheral circuit to be controlled. Each of actual instructions is weighed according to this table and decided if the instruction is heavy or light in terms of process.

Figure 7A:
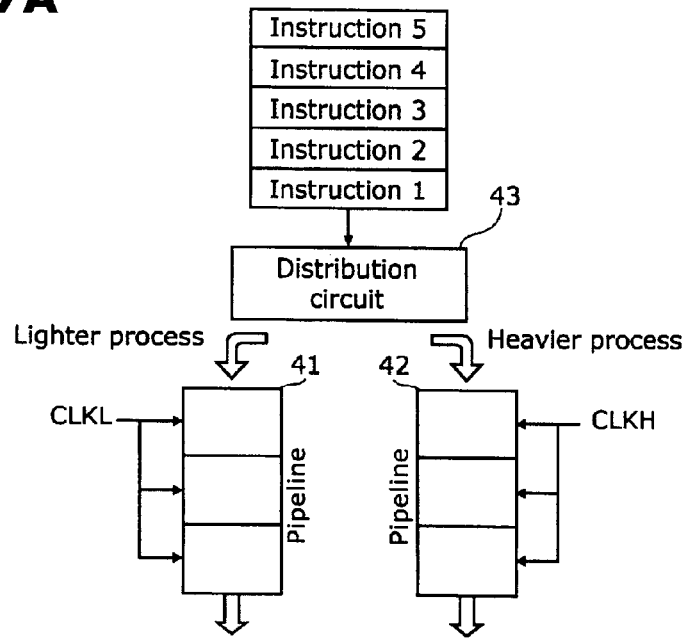
FIG. 7A is a diagram showing a configuration of a semiconductor integrated circuit having a superscalar architecture of a seventh embodiment.

FIG. 7A is a diagram showing a configuration of a semiconductor integrated circuit having a superscalar architecture of the seventh embodiment. The superscalar architecture comprises a plurality of pipelines. A CPU analyzes instructions and checks as to which instructions can be processed simultaneously, and distributes each instruction to each of these hardware pipelines for parallel processing.

An example shown in FIG. 7A shows two pipelines and a distribution circuit 43 that controls a stream of instructions so that a heavier process is distributed to a pipeline 42 and a lighter process is distributed to a pipeline 41. At the same time, the pipeline 42 receives a faster clock CLKH and the pipeline 41 receives a slower clock CLKL. In this arrangement, a lighter process is clocked with a slower clock and a heavier process is clocked with a faster clock so that outputs from these two pipelines come out almost at the same time, thereby avoiding a wasteful consumption of clocks by one of pipelines that has completed the process thereof earlier than the other. Although this example shows two pipelines and two clocks CLKH and CLKL, three or more pipelines and clocks can make more efficient processing.

Figure 7B:
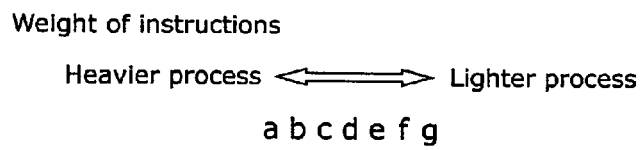
FIG. 7B is a diagram showing how instructions are weighted in the semiconductor integrated circuit having a superscalar architecture.
Figure 7C:
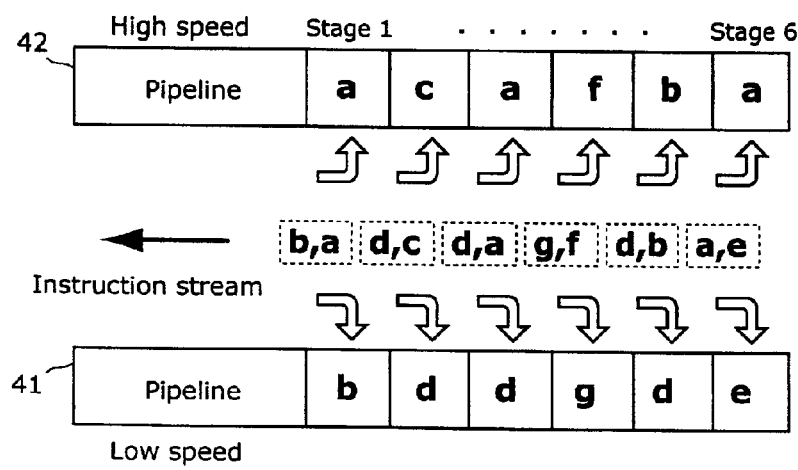
FIG. 7C is a diagram showing how instructions are distributed in the semiconductor integrated circuit having a superscalar architecture.

FIG. 7B is a diagram showing how instructions are weighed in the semiconductor integrated circuit having a superscalar architecture. FIG. 7C is a diagram showing how instructions are distributed in the semiconductor integrated circuit having a superscalar architecture. As shown in FIG. 7B, arranged in advance is a table containing resulting data obtained through a weighing process in which each instruction is weighed according to the type thereof, the type of operation, and the type of peripheral circuit to be accessed. As shown in FIG. 7C, each incoming instruction is distributed by the distribution circuit 43 among two pipelines according to the weight of the instruction. For example, there are seven instructions "a" to "g" that are included in an incoming instructions stream. It is assumed that the instruction "a" is the heaviest and the instruction "g" is the lightest. The distribution circuit controls the distribution of the instructions by comparing two instructions as a set. In this way, when two instructions "a" and "b" are fed into a first stage, the instruction "b" which is lighter than the instruction "a" is fed into the pipeline 41 that receives the slower clock and the instruction "a" which is heavier than the instruction "b" is fed into the pipeline 42 that receives the faster clock. Thereafter, incoming instructions are compared sequentially and the lighter instructions are processed in the slower pipeline and the heavier instructions are processed in the faster pipeline. In this embodiment, it is possible to reduce power consumption without reducing an overall processing speed.

Eighth Embodiment

Figure 8:
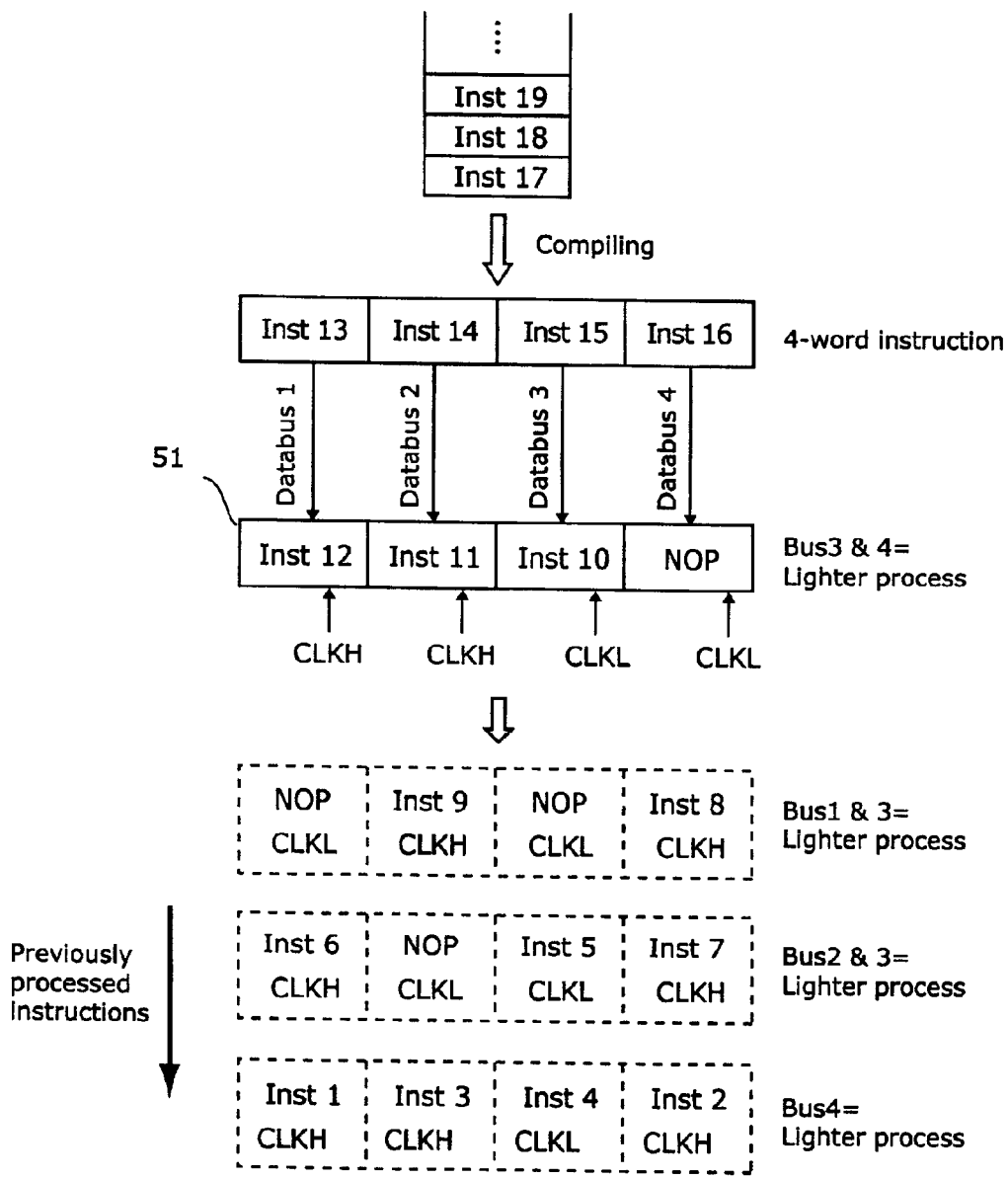
FIG. 8 is a diagram showing how instructions are processed as an example in a semiconductor integrated circuit having a VLIW architecture.

In an eighth embodiment of the present invention, a semiconductor integrated circuit having a VLIW (Very Long Instruction Word) architecture is configured in a similar manner as the previous embodiment so as to feed each independent clock to each data processing section so that the processing speed is controlled for each processing section. FIG. 8 is a diagram showing how instructions are processed, as an example, in a semiconductor integrated circuit having a VLIW architecture. In the VLIW architecture, a CPU, as a control means, processes resulting instructions obtained through a process in which, when programs are compiled, a plurality of instructions that can be executed simultaneously are converted into parallel instruction code format, usually consisting of 100 bits or more. In this embodiment, when the programs are compiled, a CPU selects a most appropriate clock frequency by analyzing each instruction and executes processing accordingly.

FIG. 8 is a diagram showing, as an example, how instructions are processed in a semiconductor integrated circuit having a VLIW architecture. In this illustration, to simplify descriptions, it is assumed that four instructions are converted into one instruction code format for parallel processing. In this architecture, the CPU converts the instructions into a four-word VLIW instruction code. While converting, the CPU selects an appropriate clock frequency for each instruction. An instruction processing circuit 51 receives clocks that have been determined and selected during the compiling process for each individual instruction. By this arrangement, it is possible to eliminate wasteful operations inside the circuit and reduce power consumption while maintaining the system performance unharmed.

Although the example shown in FIG. 8 has two clocks, CLKH and CLKL, it is also possible to use three or more different clocks for more efficient processing.

Ninth Embodiment

In a ninth embodiment, a semiconductor integrated circuit is configured so as to have clock selectors arranged hierarchically in which each clock is weighed according to frequency of use and a clock selector dealing with the most frequently used clock is arranged in the final stage of the clock selector structure. In this arrangement, a load incurred at a node at which clocks are selected is decreased, thereby enabling a swift clock change.

An example of the ninth embodiment is described hereinafter with reference to FIGS. 9A to 9C. FIG. 9A is a circuit diagram showing a conventional clock selector. FIG. 9B is a circuit diagram showing a hierarchically-arranged selector architecture of the ninth embodiment and FIG. 9C is a table showing total loads generated, when clocks are changed, in the conventional clock selector and the hierarchically-arranged clock selector of the ninth embodiment. In a conventional clock selector block 60 as shown in FIG. 9A, one clock among clocks CLK1 to CLK4 is selected as a clock to be fed to a functional block X 62 by using a selector A 61 that has a 4-input-to-1-output structure. In this structure, it is possible that a wave form of the selected clock becomes unstable in an instant of selecting clock due to a load at the node n1.

In this embodiment, as shown in FIG. 9B, a clock selector block 70 has a hierarchical structure in which all individual selectors have a 2-input-to-1-output structure. The smaller number of input terminals the selector has, the lighter the load measured at an output side becomes. Therefore, the most frequently used clock CLK1 is directly fed to a selector B 71 that is placed closest to a functional block X 74. The second frequently used clock CLK2 is directly fed to a selector C 72. A CPU (not shown), as a control means, feeds the clock CLK2 to a node n3 while the clock CLK1 is being selected by the selector B 71. In this arrangement, when the selector B 71 is switched to choose the clock CLK2, the clock CLK2 is readily available and fed. A wave form of the clock in an instant of being selected is relatively stable, because the load at the output of the selector B 71 is lighter than that of the selector A 61 for the reason as described before. The load of the selector that selects clocks CLK3 and CLK4 becomes heavier. However, it is possible to feed any one of these clocks in a stable wave form to the node n3 by switching selectors D 73 and C 72 so as to choose one of these clocks before the selector B 71 is switched for outputting to the functional block X 74. In addition, the clocks CLK3 and CLK4 are less frequently used.

FIG. 9C shows an amount of load that each circuit in the clock selector blocks 60 and 70 bear when, for example, the clock is changed in the order of CLK1, CLK2, CLK1, CLK2, and CLK3. Furthermore, the load at the node n1 is 4 and the load at the nodes n2 to n4 is 2 each. Although the less frequently used clock CLK3 or CLK4 when selected increases the total load, the frequently used clock CLK1 or CLK2 when selected decreases the total load, thereby reducing an overall load.

Tenth Embodiment

Figure 10:
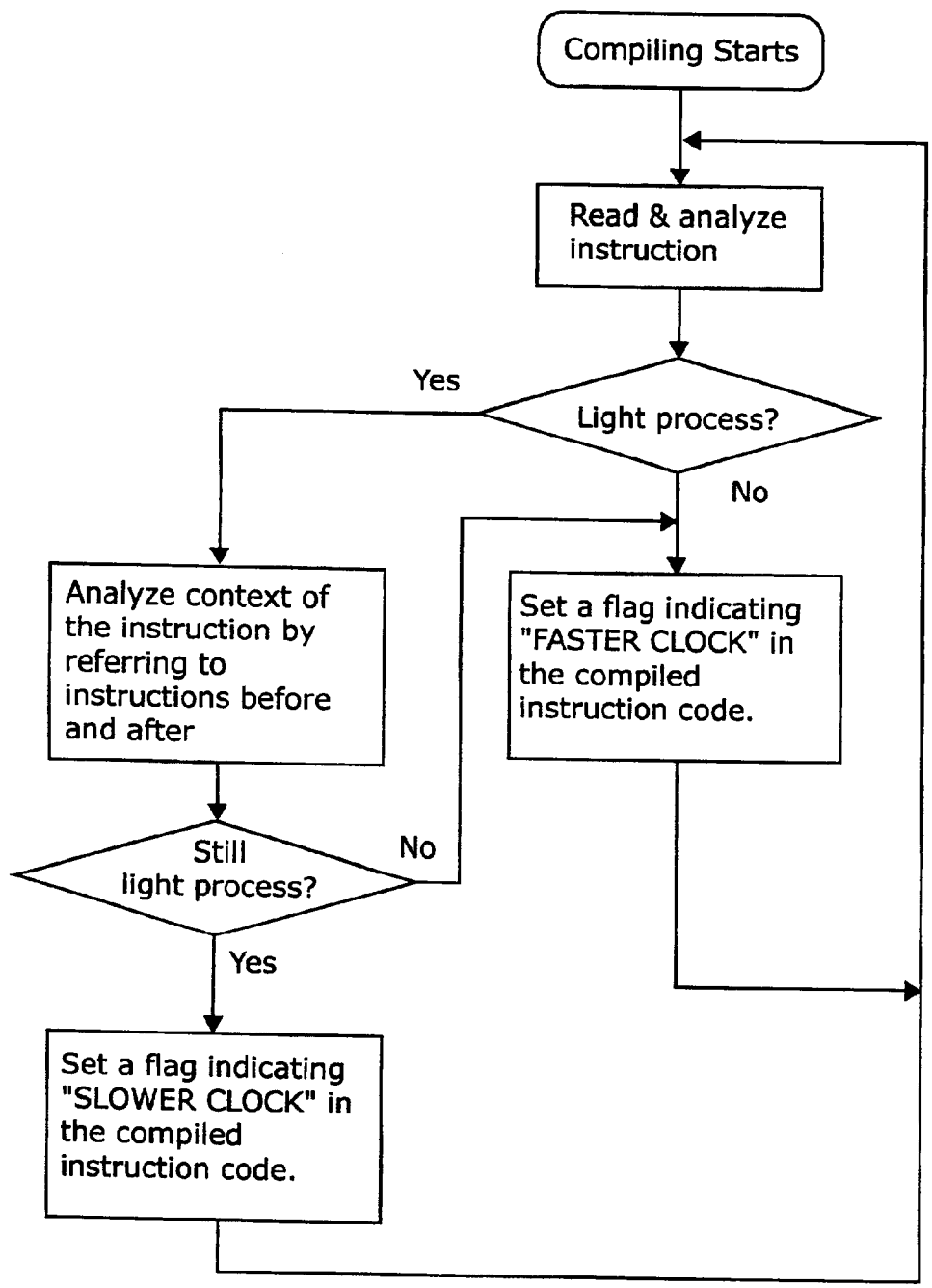
FIG. 10 is a flow chart describing a compiling process relating to a tenth embodiment.

In an tenth embodiment of the present invention, a compiler is designed so as to analyze a processing speed for each instruction and decide a most appropriate clock speed for execution of that instruction so that a set of bits having the clock speed information is generated in an outputted instruction code in order to process the instruction at that clock speed in an semiconductor integrated circuit. FIG. 10 is a flow chart describing a compiling process relating to the tenth embodiment. In other words, the compiler or a compiler function arranged in the semiconductor integrated circuit analyzes an instruction by referring to context included in instructions that are placed before and after said instruction and decides if said instruction can be processed at a different clock speed. The clock information thus obtained is written by the compiler or a CPU into a set of bits formed as part of the compiled instruction code. The semiconductor integrated circuit is configured so as to change the clock speed for each instruction cycle or each execution cycle in order to control all or a part of functional blocks at the clock speed determined during the compiling process. With this arrangement, a programmer can operate the circuit at a most appropriate clock speed automatically without being involved in manipulation of the operating speed of the internal circuits.

According to the present invention, as described before, the present invention provide the following advantages.

A semiconductor integrated circuit having one or more functional circuit blocks and executing a set of instructions is configured so as to change the speed of clock or stop supplying clocks given to each functional circuit block for each execution cycle of the instruction. Because of this configuration, it is possible to conserve power more efficiently while keeping a reduction in operating speed to an absolute minimum.

A semiconductor integrated circuit having one or more functional circuit blocks and executing a set of instructions is configured so as to read an appropriate clock speed for each functional circuit block from an instruction code in order to change the speed of clock or stop supplying clocks given to each functional circuit block for each execution cycle of the instruction code. Because of this configuration, it is possible to control the system clock without additionally inserting an instruction for controlling clocks and conserve power more efficiently while keeping a reduction in operating speed to an absolute minimum.

A semiconductor integrated circuit, having a plurality of internal or external memory blocks or an internal or external single memory block that can be dealt with as a plurality of logical memory blocks and executing a set of instructions, is configured so as to change the speed of clock according to performance of the memory block for each instruction cycle or each execution cycle. Because of this configuration in which the operating speed during memory access time can be changed, it is possible to conserve power more efficiently while keeping a reduction in operating speed to an absolute minimum when a continuous access to a slower memory block is required.

A semiconductor integrated circuit, having one or more internal or external peripheral circuits and executing a set of instructions, is configured so as to change the speed of clock according to performance of the peripheral circuit for each instruction cycle or each execution cycle. Because of this configuration in which the operating speed during access time to the peripheral circuit can be changed, it is possible to conserve power more efficiently while keeping a reduction in operating speed to an absolute minimum when a continuous access to a slower peripheral circuit is required.

A semiconductor integrated circuit having one or more functional circuit blocks and executing a set of instructions is configured so as to change the speed of clock or stop supplying clocks given to an internal CPU, a memory circuit, or a cache memory for each instruction cycle or each execution cycle according to whether a cache hit is experienced or not when data is accessed. Because of this configuration in which an appropriate clock speed is chosen depending on whether a cache hit is experienced or not, it is possible to conserve power more efficiently without sacrificing the operating speed.

A semiconductor integrated circuit, having one or more functional circuit blocks, executing a set of instructions, and having a pipeline architecture in which at least either instructions or data are processed, is configured so as to slow down a lighter process when a plurality of processes running simultaneously have different loads to be processed. In this arrangement, all the stages of the pipeline complete the process almost at the same time. Because of this configuration, it is possible to level off and reduce the power consumption as a whole and, at the same time, to suppress a peak current occurring during operation efficiently.

A semiconductor integrated circuit, having one or more functional circuit blocks and having a superscalar architecture in which a plurality of processing sections execute a set of instructions, is configured so as to supply each independent clock to each of the processing sections. Because of this arrangement in which the clock speed is changed for each processing section in accordance with the load of instructions running simultaneously, it is possible to output the results almost at the same time and reduce power consumption without sacrificing an overall processing speed.

A semiconductor integrated circuit, having one or more functional circuit blocks and having a VLIW (Very Long Instruction Word) architecture in which a plurality of processing sections execute a set of instructions, is configured so as to supply each independent clock to each of the processing sections. Because of this arrangement in which the clock speed is changed for each processing section in accordance with the load of instructions running simultaneously, it is possible, without reducing an overall processing speed, to reduce power consumption by eliminating wasteful internal operations.

A semiconductor integrated circuit having one or more functional circuit blocks and executing a set of instructions is configured so as to have a hierarchically-arranged clock selector architecture arranged in accordance with frequency of use of the clocks in changing an operating frequency or halting operation of each functional block for each instruction or execution cycle. Because of this arrangement, in comparison with a simplified clock selector, it is possible to reduce the capacity of wiring required for bearing a total amount of load generated during selecting clocks, thereby providing more stable operating condition.

A compiler is designed so as to analyze the processing speed for each instruction and select a most appropriate clock speed for executing each instruction so that a set of bits having clock speed information are generated in an output instruction code for operation at that clock speed selected in an semiconductor integrated circuit. The semiconductor integrated circuit having one or more functional circuit blocks and executing a set of instructions is configured so as to read the set of the specific bits of the instruction code for determining a most appropriate clock speed for each functional circuit block in order to change the speed of clock or stop supplying clocks given to each functional block for each instruction cycle or execution cycle. Because of this configuration, it is possible, without additionally inserting an instruction for controlling clocks when making programs, to conserve power while keeping a reduction in operating speed to an absolute minimum.

What is claimed is:

1. A semiconductor integrated circuit having one or more functional circuit blocks and executing a set of instructions, comprising:
    a clock supply circuit that supplies one or more clocks for driving said one or more functional circuit blocks at a different frequency; and
    a clock selector circuit that selects a clock being fed to each of the functional circuit blocks for each execution cycle,
    wherein the clock supply circuit and the clock selector circuit are configured so as to change an operating frequency or halt operation of said one or more functional circuit blocks for each execution cycle.

2. A semiconductor integrated circuit having one or more functional circuit blocks and executing a set of instructions, comprising:
    a clock supply circuit that supplies one or more clocks for driving said one or more functional circuit blocks at a different frequency;
    a clock selector circuit that selects a clock being fed to each of the functional circuit blocks for each execution cycle; and
    an instruction decoder circuit that feeds a selection signal to the clock selector circuit for selecting a most appropriate clock from one or more clocks by analyzing prescribed bits of an instruction code,
    wherein the clock supply circuit and the clock selector circuit are configured so as to change an operating frequency or halt operation of said one or more functional circuit blocks for each execution cycle.

3. A semiconductor integrated circuit having, internally or externally, one or more memory blocks or a single memory block that is dealt with as a plurality of logical memory blocks and executing a set of instructions, comprising:
    a clock supply circuit that supplies one or more clocks for driving the semiconductor integrated circuits, a part thereof, said one or more memory blocks, or the single memory block at a different frequency when memory is accessed;
    a clock selector circuit that selects a different clock for each execution cycle when memory is accessed; and
    a memory select signal circuit that identifies a memory block to be accessed,
    wherein the clock supply circuit and the clock selector circuit are configured so as to change an operating frequency or halt operation of the semiconductor integrated circuit, a part thereof, said one or more memory blocks, or the single memory block for each execution cycle in accordance with performance of the memory block that is identified by the memory select signal circuit.

4. A semiconductor integrated circuit having one or more peripheral circuits internally or externally and executing a set of instructions, comprising:
    a clock supply circuit that supplies one or more clocks for driving the semiconductor integrated circuits, a part thereof, or said one or more peripheral circuits at a different frequency when said one or more peripheral circuits are accessed;
    a clock selector circuit that selects a different clock for each execution cycle when said one or more peripheral circuits are accessed; and
    an I/O select signal circuit that identifies a peripheral circuit to be accessed,
    wherein the clock supply circuit and the clock selector circuit are configured so as to change an operating frequency or halt operation of the semiconductor integrated circuit, a part thereof, or said one or more peripheral circuits for each execution cycle in accordance with performance of the peripheral circuit that is identified by the I/O select signal circuit.

5. A semiconductor integrated circuit having one or more memory blocks and a cache memory internally or externally and executing a set of instructions, comprising:
    a clock supply circuit that, according to whether a cache hit is experienced or not when data is accessed, supplies one or more clocks for driving the semiconductor integrated circuits, a part thereof, said one or more memory blocks, or the cache memory at a different frequency;
    a clock selector circuit that, according to whether a cache hit is experienced or not, selects for each execution cycle a different clock when said one or more memory blocks or the cache memory is accessed; and
    a memory select signal circuit that identifies a memory block or the cache memory to be accessed,
    wherein the clock supply circuit and the clock selector circuit are configured so as to change an operating frequency or halt operation of the semiconductor integrated circuit, a part thereof, the memory blocks, or the cache memory for each execution cycle according to whether a cache hit is experienced or not when data is accessed.

6. A semiconductor integrated circuit having one or more functional circuit blocks and executing at least either of data processing or instruction processing in a pipeline having a plurality of stages when running a set of instructions, comprising:
    a clock supply circuit that supplies one or more clocks for driving the stages at a different frequency;
    a clock selector circuit that selects a different clock to be given to each of the stages for each execution cycle; and
    an analyzer circuit that analyzes the instructions and feeds a selection signal to the clock selector circuit for selecting a most appropriate clock for each of the stages from one or more clocks, wherein the analyzer circuit is arranged so as to analyze the instructions to be executed in each stage of the pipeline and feeds a signal to the clock selector circuit so that, when the stages execute the instructions having a load different from each other, a stage executing an instruction having a lighter load is provided with a slower clock.

7. A semiconductor integrated circuit having one or more functional circuit blocks and executing a set of instructions in a plurality of pipelines configured as a superscalar architecture, comprising:

a clock supply circuit that supplies one or more clocks for driving each of the pipelines at a different frequency;

a clock selector circuit that selects a different clock to be fed to each of the pipelines for each execution cycle;

an analyzer circuit that analyzes the instructions and assign a weight value to each instruction according to an amount of load thereof to be processed; and an instruction distributor circuit that distributes the instructions among the pipelines by comparing the instructions in a form of the set with weight values contained in a table generated by the analyzer circuit, wherein the clock selection circuit selects a faster clock for a pipeline that executes an instruction having a heavier load and selects a slower clock for a pipeline that executes an instruction having a lighter load.

8. A semiconductor integrated circuit having one or more functional circuit blocks and executing a set of instructions in a plurality of processing sections configured as a VLIW (Very Long Instruction Word) architecture, comprising:

a compiler that converts the instructions into a VLIW format and assigns a most suitable clock to each of the instructions in accordance with content thereof to be processed;

a clock supply circuit that supplies one or more clocks for driving each of the processing sections at a different frequency; and a clock selector circuit that selects the clock assigned to each instruction by the compiler so that the selected clock is fed to a corresponding processing section for each execution cycle, wherein the semiconductor integrated circuit is configured so as to provide each of the processing sections with an independent clock that enables the processing sections to operate at a frequency different from each other according to a load of the instructions to be executed simultaneously.

9. A semiconductor integrated circuit having one or more functional circuit blocks and executing a set of instructions, comprising:

a clock supply circuit that supplies one or more clocks for driving said one or more functional circuit blocks at a different frequency; and a clock selector circuit that selects a clock being fed to each of the functional circuit blocks for each execution cycle, wherein the clock selector circuit has a hierarchically-arranged clock selector architecture in which clock branches are arranged hierarchically in accordance with frequency of use of the clocks in changing an operating frequency or halting operation of each functional circuit block while the instructions are being executed.

10. A semiconductor integrated circuit having one or more functional circuit blocks and executing a set of instructions, comprising:

a compiler that determines a most appropriate clock for each instruction according to content thereof to be executed and writes information thereof thus determined to prescribed bits of a compiled instruction code;

a clock supply circuit that supplies one or more clocks for driving said one or more functional circuit blocks at a different frequency;

a clock selector circuit that selects a clock being fed to each of the functional circuit blocks for each execution cycle; and an instruction decoder circuit that feeds a selection signal to the clock selector circuit for selecting a most appropriate clock from one or more clocks by analyzing the prescribed bits of the instruction code, wherein the clock supply circuit and the clock selector circuit are configured so as to change an operating frequency or halt operation of said one or more functional circuit blocks for each execution cycle.

* * * * *